United States Patent [19]

Mullarkey et al.

[11] Patent Number: 6,028,819
[45] Date of Patent: Feb. 22, 2000

[54] METHOD AND SYSTEM OF SIMULATING AND OPTIMIZING LAND SEISMIC OPERATIONS

[75] Inventors: Peter W. Mullarkey, Austin, Tex.;
Peter H. Canter, Bekkestua, Norway;
Ruven E. Brooks, Shorewood, Wis.;
Douglas J. Morrice, Austin, Tex.;
Astrid S. Kenyon, Cedar Park, Tex.;
Peter T. Highnam, Austin, Tex.

[73] Assignee: Schlumberger Technology Corporation, Austin, Tex.

[21] Appl. No.: 09/210,975

[22] Filed: Dec. 14, 1998

Related U.S. Application Data

[60] Provisional application No. 60/069,738, Dec. 16, 1997.

[51] Int. Cl.[7] .................................................... G01V 1/20
[52] U.S. Cl. ............................. 367/37; 367/56; 367/55
[58] Field of Search .............................. 367/13, 56, 73, 367/55, 63, 74, 37

[56] References Cited

U.S. PATENT DOCUMENTS 4,369,507  1/1983  Carruth, Jr. ................................ 367/56

OTHER PUBLICATIONS

Sisti, A.F. and Farr, S. D., Modeling and Simulation, Enabling Technologies for Military Applications, Proceedings of the 1996 Winter Simulation Conference, Dec. 1996, pp. 877–883.

Hollenbach, J.W. and Alexander, W. L., Executing the Modeling and Simulation Strategy—Making Simulation Systems of Systems a Reality, Proceedings of the 1997 Winter Simulation Conference, Dec. 1997, pp. 948–954.

Kannan, G., Martinez, J. C. and Vorster, M. C., A Framework for Incorporating Dynamic Strategies in Earth–Moving Simulations, Proceedings of the 1997 Winter Simulation Conference, Dec. 1997, pp. 1119–1126.

Morrice, D. J., Mullarkey P. W. and Kenyon, A. S., Simulation of a Signal Quality Survey, Proceedings of the 1997 Winter Simulation Conference, Dec. 1997, pp. 1265–1272.

Hall, R. W. and Partyka, J. G., On the Road to Efficiency, OR/MS Today, Jun. 1997, pp. 38–47.

Joines, J. A. and Roberts, S. D., Design of Object–Oriented Simulations in C++, Proceedings of the 1994 Winter Simulation Conference, Dec. 1994, pp. 157–165.

Corbley, K. P., Fine Tuning Forestry Maps with Satellite Data, EOM, Jul. 1997, pp. 16–18.

*Primary Examiner*—Christine Oda
*Assistant Examiner*—Anthony Jolly
*Attorney, Agent, or Firm*—Taylor Russell & Russell, P.C.

[57] ABSTRACT

A method and system for simulating and optimizing land seismic survey operations. The method and system utilizes spatially referenced data and nonspatial data relevant to land seismic survey operations such as high resolution satellite and airborne imagery and uses discrete event information about land seismic survey operation to simulate a land seismic survey. The output of the simulation is a detailed list of survey events. Mathematical optimization techniques are used to enhance the efficiency of the survey execution via optimal route planning and optimal allocation of survey logistical components. The invention uses a discrete event simulator which is an object-oriented software program with survey geometry objects that represent the survey design, resources objects that represent resources needed to conduct survey operations and manager objects to coordinate the resource objects within the specified survey geometry.

47 Claims, 12 Drawing Sheets

METHOD AND SYSTEM OF SIMULATING AND OPTIMIZING LAND SEISMIC OPERATIONS

This application claims the benefit of U.S. Provisional Application No. 60/069,738, filed on Dec. 16, 1997.

BACKGROUND

This invention relates generally to simulating and optimizing land seismic survey operations. More particularly, the invention is a method and system for simulating and optimizing seismic surveys by applying operations research methodologies to the land seismic surveying problem domain.

Land seismic surveys are typically conducted over large geographical areas (tens to hundreds of square kilometers). These surveys take anywhere from a few days to a few years with crews ranging from 20 to 1000 people, requiring capital equipment valued in the tens of millions of dollars, and generating survey revenues ranging from tens to hundreds of millions of dollars. The challenge is to bid on, plan for and conduct these large, complicated and expensive projects in a profitable manner. When we use the term "land seismic survey", it includes purely land operations as well as the "transition zone seismic surveys" which can involve swamps, shallow waters, and nearshore operations.

The invention combines and enhances technologies to improve the profitability of land seismic surveys. Surveys are tending to be larger, involve new technologies, occur in mature oilfields containing pipelines and other structures and are executed under tight financial controls. Advances in airborne and satellite imaging technology are exploited to produce terrain maps with locations classified in terms meaningful to the planning and execution of the survey. Advanced visualization and virtual environment technology is used to view the information. Discrete event simulation is used to evaluate different options for executing the survey, producing time and risk estimates for particular equipment and personnel configurations, and also enabling "what-if" scenario analysis to improve decision-making. Mathematical optimization technologies are used to enhance the efficiency of the job execution via optimal route planning and other logistical components. The invention can be used throughout the life cycle of the land seismic survey to simulate and optimize the operations: beginning with the bidding and planning phase through the execution of the land seismic survey itself and also during post-job operational analysis.

The invention exploits technological advances by using high resolution or satellite digital imagery and processing the digital data from that imagery to produce high resolution terrain elevation maps and store that data in a Geographic Information System (GIS). Discrete event simulation techniques then are used to run simulations and model the land seismic survey operations. Various aspects can be optimized using mathematical programming techniques. The simulation and optimization can be done prior to the actual conduct of the land seismic operation for the purposes of planning and bidding. It can also be done while the survey is being executed, for example to solve and provide an optimal solution for a problem encountered during the operation itself.

Currently in land seismic surveys, the primary tools used to support bidding, planning and execution are spreadsheets and aerial photographs. Discrete event simulation techniques have been applied in the manufacturing domain and in the design of electronic systems but have not generally been applied to the outdoor, unstructured environment of land seismic surveys. Military war-gaming and civil engineering construction projects to some extent have used discrete event simulation in the outdoor environment. This invention adds the complex, specialized behaviors of the components in a land seismic survey; explicit economic considerations; and integrated ability to perform structured what-if analyses of the survey's likely operational performance for particular tactical decisions (such as equipment and crew mix). Compared to the state-of-the-art spreadsheet, the present invention is able to explicitly account for dynamic behaviors.

Satellite and airborne digital imagery and digital terrain maps have also been used by military and civil authorities for some time. For a land seismic survey a much higher resolution is needed than has been used in the past, on the order of two meter by two meter image elements, and vertical resolution of about the same. Imagery of this quality is only now becoming commercially available. This invention exploits multi-spectral, laser and radar imagery combined with surface geology knowledge to provide surface classification. These techniques have been in use before (e.g., LandSat images for crop health) but not at the resolutions needed, in both the spatial resolution and classification senses. Lastly, the use of optimization techniques for route planning and logistics are widely known. The majority of the published work deals only with deterministic planning, and does not accommodate stochastic behaviors. This invention includes the ability to improve the logistics (including site selection and route planning) of a land seismic survey, including stochastic behaviors, using simulation and optimization techniques.

SUMMARY

The method and system of the present invention provides the ability to plan the land seismic survey job in detail, prior to even visiting the proposed site, including tradeoff analyses for different options, with the goal of optimizing profitability and minimizing risk. The information produced is used in the decision-making process, and, if appropriate, in a bid to a client. Once the job is underway the same capabilities are provided to the field personnel, allowing them to make highly informed decisions based on actual (versus planned) status. The system can also be used for post-job operational analysis. These capabilities are an improvement over the current systems, which are typically based on spreadsheets.

The invention includes a Virtual Scouting component that obtains high resolution airborne or satellite digital imagery and processes it into high resolution terrain elevation maps, with each "pixel" on said maps labeled with information relevant to land seismic surveying. The imagery is not just passive optical imagery. Airborne and space active sensors such as laser and radar technologies are used. These provide better elevation information, additional classification information and some subsurface information. The resulting imagery may be "toured" using visualization and virtual reality technologies, as well as used as described below.

The invention employs a Discrete Event Simulation component that exploits the labeled terrain maps, whose data is held in a Geographic Information System, to run land seismic acquisition simulations that include complex dynamic behaviors of the components. These simulations include stochastic aspects, e.g., breakdown rates, travel-times. The simulations permit trade-off analyses for different routes and different crew and equipment options. Each simulation produces a detailed listing of the events that occur, this listing can be used for various purposes, including a detailed visual animation to review the simulated behavior and to order events in the actual job.

The invention optimizes certain aspects of the job using mathematical techniques. These aspects include route-planning and the selection of geographical locations for the various needs of the land seismic crew.

The invention also uses historical operations data to improve accuracy of simulations and optimization.

Once the actual land seismic survey is underway, the earlier analysis and information gathered is used to support decision-making. The same simulation, optimization and planning tools are available since the events on the ground are unlikely to follow exactly any prior plan. The actual status of the land seismic survey at any given time is used as the basis for decision-making.

The simulation model improves the planning and operations of a seismic survey in a number of ways. In particular, simulation:

1. provides a more accurate quantification of survey duration times than the current modeling approaches. Current approaches include spreadsheets (primary) and project planning tools (secondary). Neither methodology can accurately model the complex operational details of a seismic survey in the same manner as simulation. Therefore, a properly designed and calibrated simulation will provide improved estimates of the duration of surveys. Better estimates directly impact the bottom line by enabling a decision maker to construct more accurate bids for a survey.
2. provides a better way to account for uncertainty. Current spreadsheet models use point estimates to quantify operational tasks such as signal crew movement times. The uncertainty associated with these tasks is incorporated into aggregate correction factors (e.g., terrain adjustment factor) which are used to adjust the spreadsheet model results. With simulation, uncertainty in such things as crew and vehicle movement times, and equipment failures and repairs can be directly incorporated into the model using probability distributions. The latter is a much more accurate way to account for uncertainty. Overall, stochastic simulation provides a better way for decision makers to quantify and manage risk.
3. permits what-if or scenario analysis. Simulation will create new opportunities for experimenting with different design and operating strategies. This includes consideration of different types of survey designs, different source sequencing strategies, different resource allocation strategies, and different decision rules. Based on points (1) and (2), spreadsheets models cannot handle this task. Additionally, experimentation in the field is too costly.
4. permits the examination of complex interaction effects from simultaneously changing policies or input parameters (both will be referred to as factors). Experienced field personnel might be able to predict the effect of changing a single factor (e.g., an increase in the number of transport vehicles). However, it is much more difficult, even for experienced personnel, to predict the effect of changing multiple factors simultaneously (e.g., increase equipment, vehicles, and crews simultaneously). Simulation can be used to explore and quantify the benefits of such changes.

The present invention is a computer implemented method for simulating and optimizing land seismic survey operations, comprising the steps of obtaining spatially referenced data and nonspatial data relevant to a land seismic survey operation, inputting discrete event information about the land seismic survey operation, simulating a land seismic survey utilizing the spatially referenced data, the nonspatial data and the discrete event information, and optimizing the simulated land seismic survey. The steps listed above may be performed prior to the land seismic survey with the optimizing step results saved and used to develop a price for the land seismic survey. Alternatively, the steps listed above may be performed during the land seismic survey operation, with the optimizing step results saved and used to alter tactical decisions while the survey is being performed. In the optimizing step, mathematical programming techniques are used to optimize simulating a land seismic survey and determine optimal locations for survey bases, field equipment and optimal equipment and crew routing.

The spatially referenced data is high resolution digital imagery. The high resolution digital imagery can be from satellite or airborne sensors and the sensor type can be optical, laser or radar. Nonspatial data is selected from the group consisting of personnel experience and historical data. The spatially referenced data may be in the form of a high resolution digital terrain map and is stored in a geographical information system. The high resolution terrain map is used to scout sites prior to bidding a price for the land seismic survey. The user is allowed to view the terrain map interactively on a computer screen.

In the inputting discrete event information step, a user is allowed to adjust parameters that control complex dynamic behaviors of discrete events. The complex dynamic behaviors of the discrete events include stochastic processes. The stochastic processes include breakdown rates, weather-related delays, and travel times. Historical operations data may also be input to improve accuracy of the simulating and optimizing steps.

In the simulating step, a user is permitted to perform trade-off analyses for different routes, different crews, and different equipment options of the land seismic survey. The output of the simulating step is a detailed listing of events to occur prior to and during the land seismic survey. In the optimizing step, the detailed listing of events is used to optimize and order the events to occur during the land seismic survey. The optimizing step is accomplished using mathematical programming techniques. The simulating step is accomplished using a discrete event simulator. The discrete event simulator is an object oriented software program with objects comprising survey geometry objects that represent survey design, resources objects that represent resources needed to conduct survey operations and manager objects to coordinate the resource objects with the survey geometry objects. The resource objects are selected from the group consisting of transport vehicles, layout crews, recording crews, signal crews, packing crews, trouble shooting crews and mechanics crews. The method further comprises modeling interactions between the survey geometry objects, resources objects and manager objects using an operations cycle model. The operations cycle model comprises a duration of survey operations cycle, a daily operations cycle, an individual operations cycle for a single resources object and a collective operations cycle for multiple resources objects. The duration of survey operations cycle comprises mobilization, signal generation and recording and demobilization. The daily operations cycle comprises startup, production and shutdown. Startup comprises travel to the survey site, turning on equipment, testing the equipment, diagnosing problems and repairing problems. Production comprises signal generation and recording activities. Shutdown comprises deciding when to stop tasks for the day, preparing equipment for shutdown, logging data, and travelling back to base camp from a survey site.

Each object comprises its own operation cycle. The collective operations cycle for multiple resource objects comprises an operations cycle for shooting and recording objects. The operations cycle for shooting and recording objects comprises preparing a transport vehicle to pickup equipment prepared by packing crews, preparing to drop-off receiver equipment for installation by layout crews, installing receiver equipment by layout crews for use by recording crews, sending signals by signal crews which are captured by an installed set of receiving equipment and preparing available equipment by packing crews for pickup by the transport vehicles. The operations cycle model controls behavior of the object. The operations cycle model accounts for uncertainty in the behavior of the object by using probability distributions.

The output of the discrete event simulator provides timing estimates for the survey and breakdown probabilities. The discrete event simulator allows a user to investigate the impact of changing a parameter or parameters of a discrete event. The discrete event simulator produces an event list of survey events as they occur, the event list being displayed to the user on the terrain map as a two-dimensional display of motion of survey components over an area of the survey site. Historical operations information is used by the discrete event simulator to assess survey risk based on information from the historical operations.

The present invention also comprises computer executable software code stored on a computer readable medium, the code for simulating and optimizing land seismic survey operations comprising code to obtain spatially referenced data and nonspatial data relevant to a land seismic survey operation, code to input discrete event information about the land seismic survey operation, code to simulate the land seismic survey events utilizing the spatially referenced data, the nonspatial data and the discrete event information and code to optimize and order simulated survey events.

The present invention comprises a computer-readable medium having computer-executable software code stored thereon, the code for simulating and optimizing land seismic survey operations comprising code to obtain spatially referenced data and nonspatial data relevant to a land seismic survey operation, code to input discrete event information about the land seismic survey operation, code to simulate the land seismic survey events utilizing the spatially referenced data, the nonspatial data and the discrete event information and code to optimize.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Figure 1:
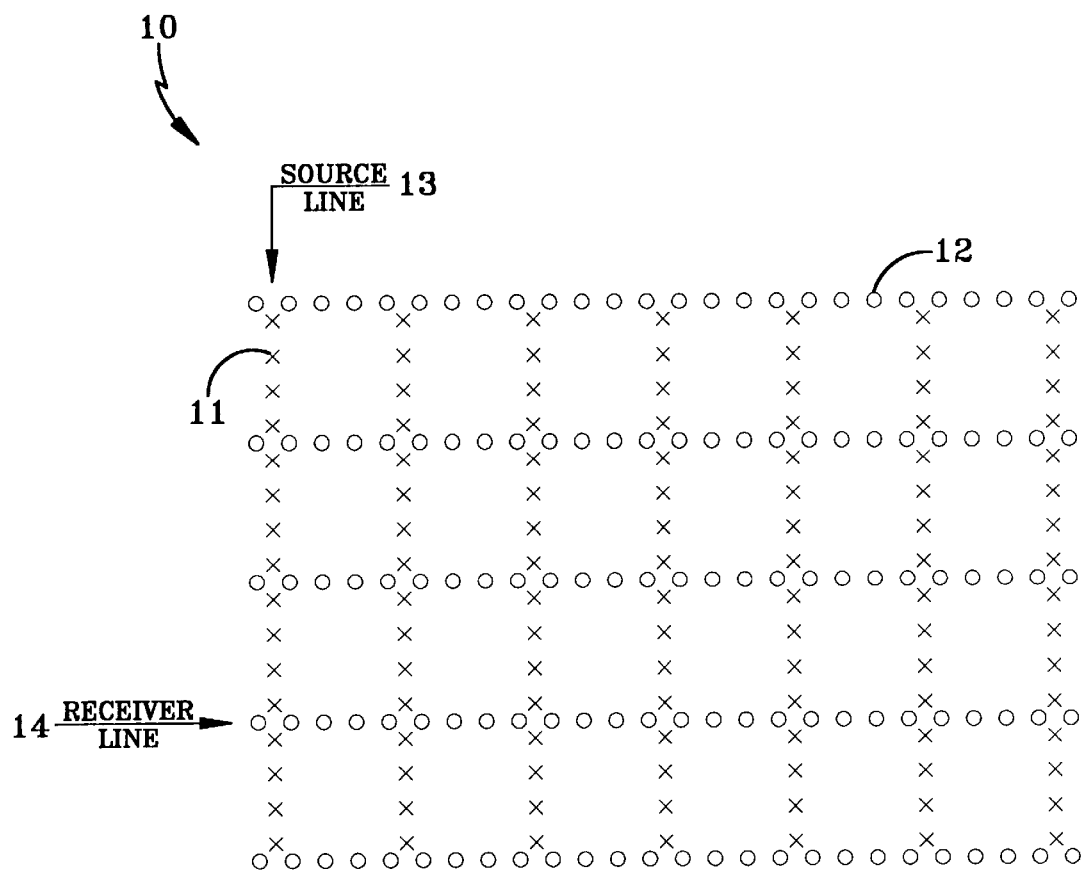
FIG. 1 shows a typical orthogonal survey design for a land seismic survey.

FIG. 1 shows a typical orthogonal survey design for a land seismic survey 10 where sources and receivers are located on a nominal plane over the earth's surface and form a grid pattern. Signal generation (shooting) and signal monitoring (receiving) constitute the two main operations in a seismic survey. Locations from which a signal is sent are called source locations. The vertical lines in FIG. 1 contain source locations 11 (represented by an "X"). Locations at which a signal is received are called receiver locations. The horizontal lines contain receiver locations 12 (represented by a "•"). The source and receiver locations form a geometric pattern over a large geographic area. For example, FIG. 1 depicts a typical survey design with sources 11 arranged along several parallel lines (source lines 13) and receivers 12 laid out along parallel lines (receiver lines 14) perpendicular to the source lines 13. Along each source 13 and receiver line 14, locations are typically spaced about 50 meters apart. The entire survey area can range from tens to tens of hundreds of square kilometers.

Figure 2:
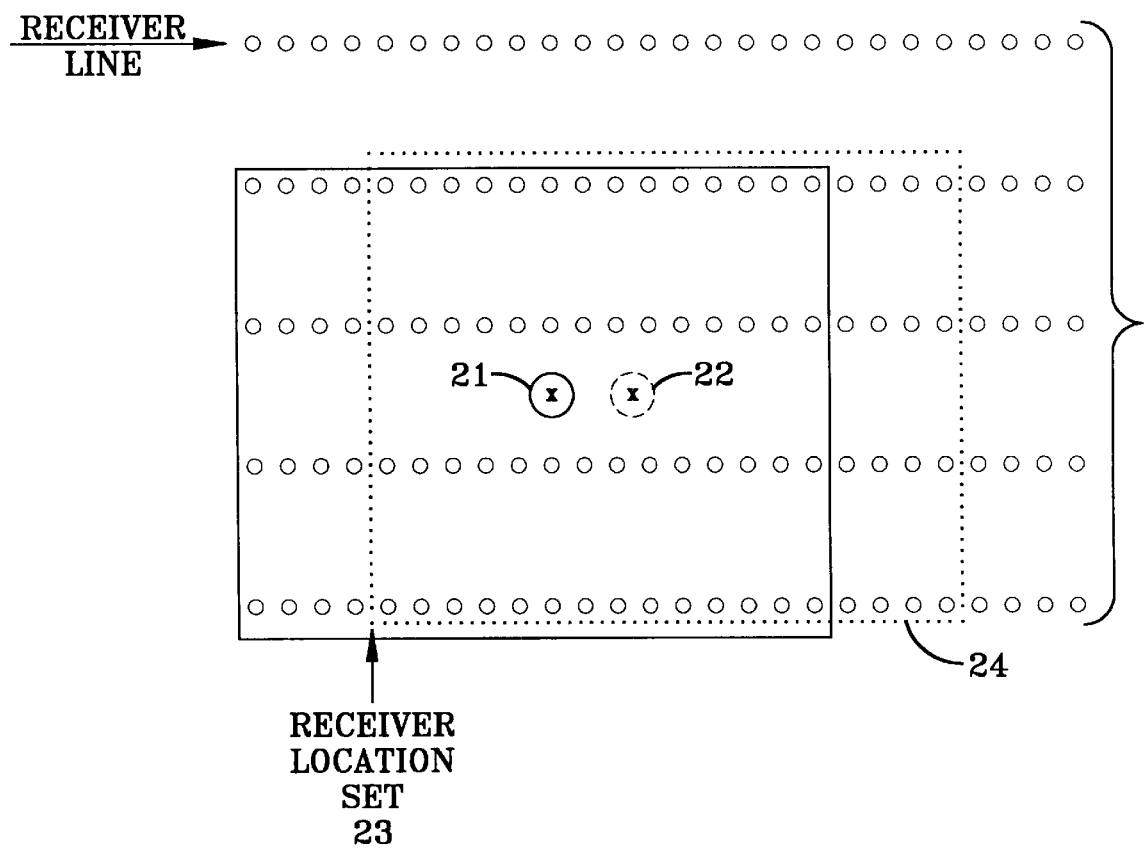
FIG. 2 depicts a survey design showing the relationship between sources and receivers.

To conduct the survey, signals are sent by a signal crew from a sequence of source locations (one-at-a-time) to a sequence of overlapping receiver location sets. FIG. 2 depicts two source locations 21–22 along with their respective receiver location sets 23–24. Each receiver location set 23–24 is enclosed in a rectangle centered on its corresponding source location (21 or 22). Source sequencing is a function of the design of the survey and user input on the possible partitioning of the survey into subsections. Surveys are partitioned because of receiving equipment constraints and physical and cultural obstacles on the survey. The signals are monitored by equipment at a set of receiver locations and then recorded by an acquisition system operated by a recording crew. Measurements from a single source location 21 or 22 typically take less than a minute. Moving equipment from one receiver location set 23 to the next 24 can take several minutes or hours. To avoid signal sending delays, extra equipment is used to cover several receiver location sets ahead of the set required by the current source location. The acquisition system turns different receivers on and off so that the required receiver set is turned on for each source measurement. Typically, there is not enough receiver equipment available to cover the entire survey area, so that equipment movement is needed. Receiver equipment consists of sensors, batteries to power the equipment, and cables to connect all the equipment together. The equipment is brought to location by transport vehicles. It is then installed (unpacked, laid out, and connected) by crews of workers called layout crews. The transport vehicles retrieve equipment from other parts of the survey where it is no longer required. However, before doing so, the equipment must be prepared (disconnected, rolled up, and packaged) by crews of workers called packing crews. The movement of receiver equipment is the most time and resource intensive operation on a seismic survey. The goal of this operation is to move receiving equipment in a manner that does not impede signal generation production. A seismic survey contains a lot of equipment that needs to be kept in proper working order. Crews called trouble shooters are assigned to test and repair failed receiving equipment. They also perform other types of routine maintenance on the receiving equipment such as battery charging and replacement. Maintenance of other equipment such as transport vehicles is handled by mechanics personnel. The overall operation of a seismic survey involves the coordination between signal generation, recording, transport, layout, packing, and maintenance.

Figure 3:
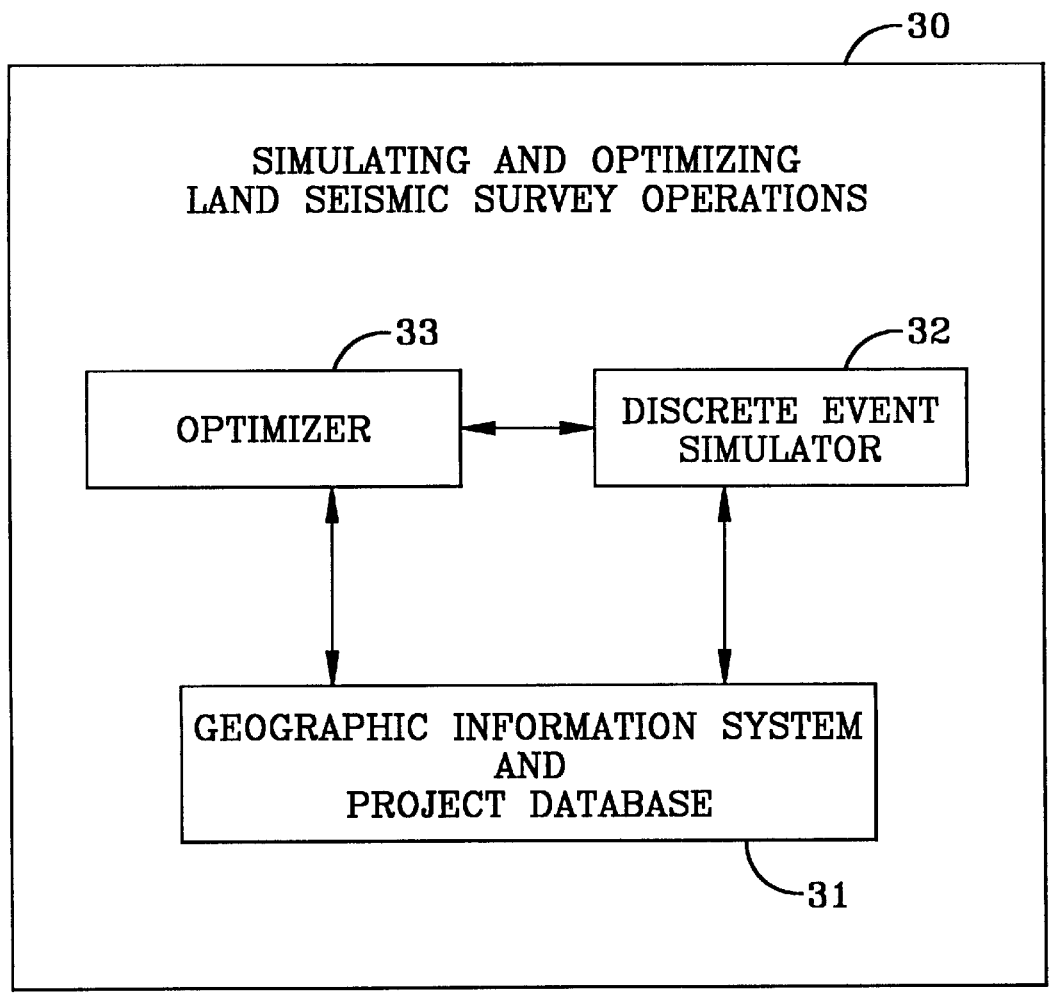
FIG. 3 is a block diagram of the system of simulating and optimizing land seismic survey operations.

FIG. 3 is a block diagram of the system of simulating and optimizing land seismic operations 30. The invention employs a Discrete Event Simulator component 32 that exploits the labeled terrain maps, whose data is held in a Geographic Information System 31, to run land seismic acquisition simulations that include complex dynamic behaviors of the components. Project database information 31 includes other nonspatial data relevant to the project such as prior optimization results and field discovered information, including client requirements, environmental impact minimization strategies and all other information pertinent to effective, efficient, safe and profitable operations that minimize damage to the environment. These simulations include stochastic aspects, e.g., breakdown rates, travel-times. The simulations permit trade-off analyses for different routes, different shooting patterns and different crew and equipment options. Each simulation produces a detailed listing of the events that occur which can be used to order events in the actual job. The invention optimizes 33 certain aspects of the job using mathematical techniques. There are many roles for optimization. Some aspects of the job that can be optimized include route-planning and the selection of geographical locations for the various needs of the land seismic crew.

Figure 4:
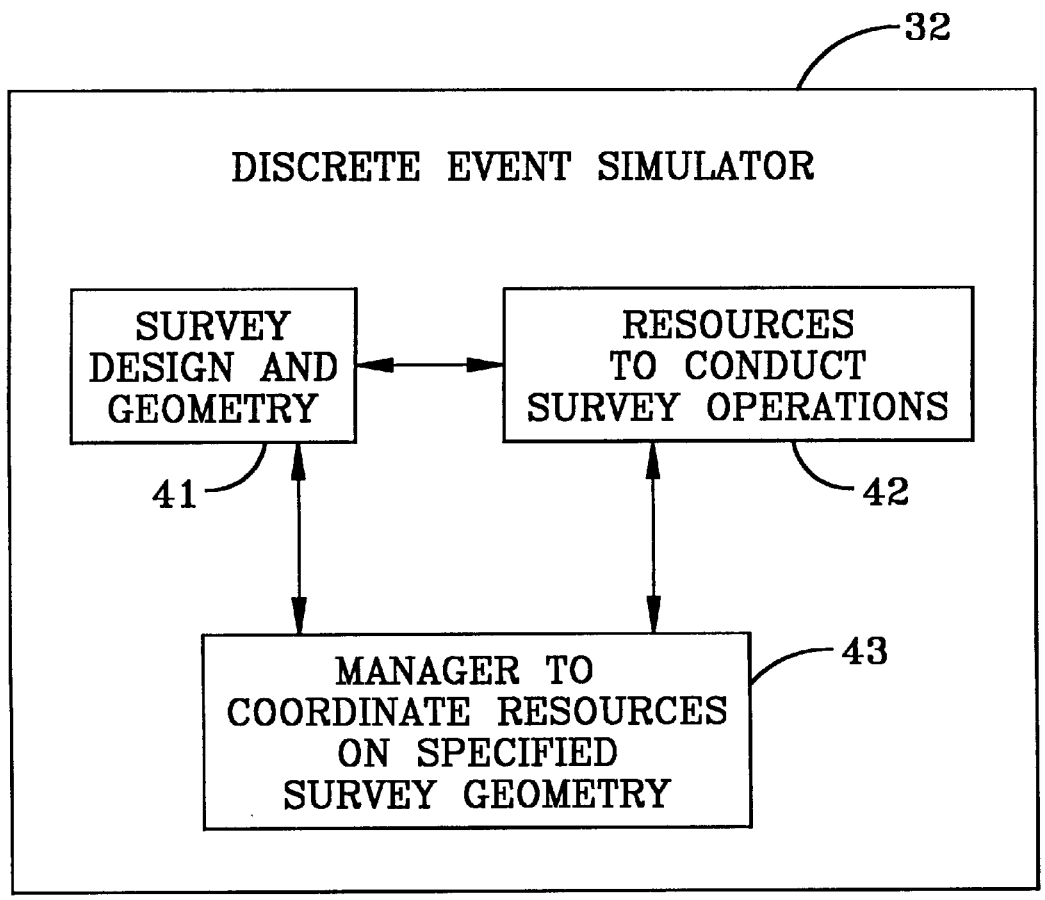
FIG. 4 is a block diagram of the discrete event simulator.

FIG. 4 is a block diagram of the discrete event simulator (32 in FIG. 3). The discrete event simulator 32 has objects that fall into three main categories: (i) survey design or geometry 41, (ii) resources to conduct the survey operations 42 and (iii) managers to coordinate the resources on a specified survey geometry 43.

The focus is on the resource objects (of the resources to conduct the survey operations 42) because they are dynamic objects (i.e., objects that perform operations in which simulated time elapses) that constitute the heart of the simulation model. Objects in categories (i) 41 and (iii) 43 are not dynamic but instead contain information on survey design and operations strategies.

Figure 5:
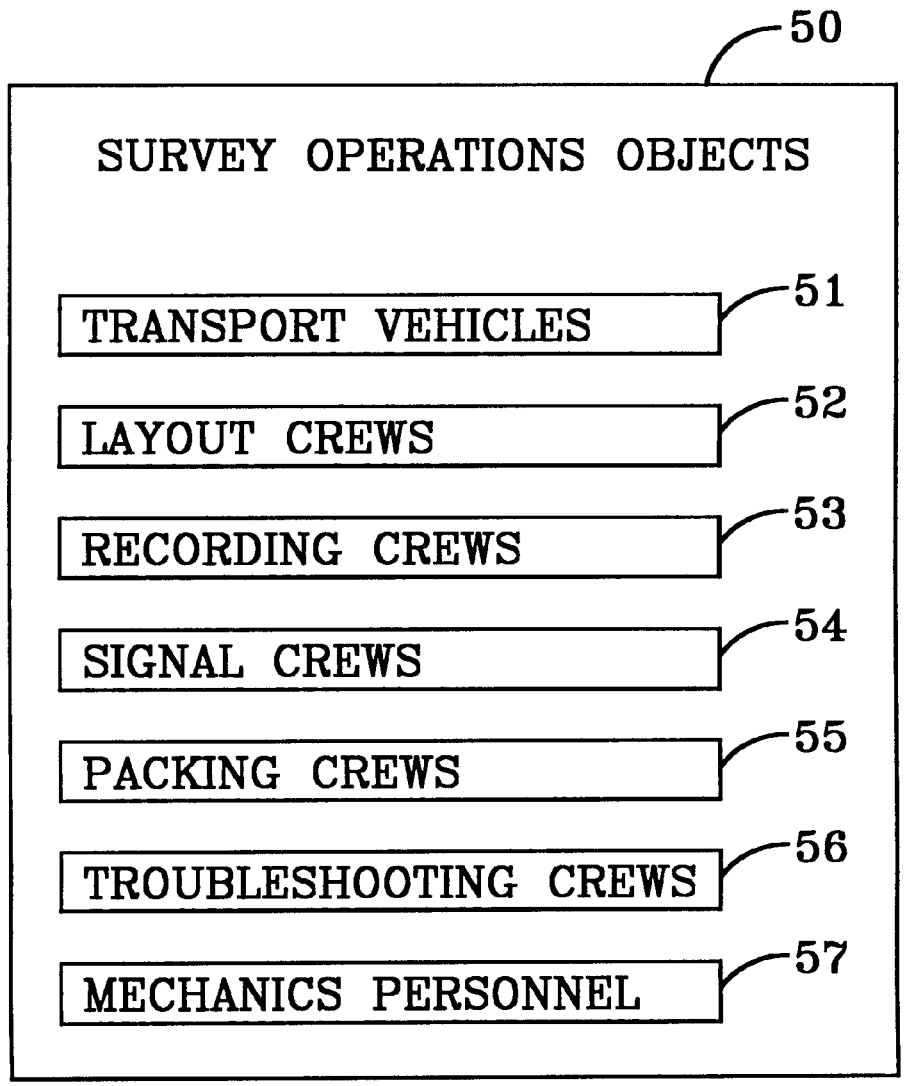
FIG. 5 is a block diagram of the resources needed to conduct survey operations.

The main survey operations objects 50 of the resources needed to conduct survey operations (42 in FIG. 4) are shown in FIG. 5 and include: (i) transport vehicles 51, (ii) layout crews 52, (iii) recording crew 53, (iv) signal crews 54, (v) packing crews 55, (vi) trouble shooting crews 56, and (vii) mechanics personnel 57.

Figure 6:
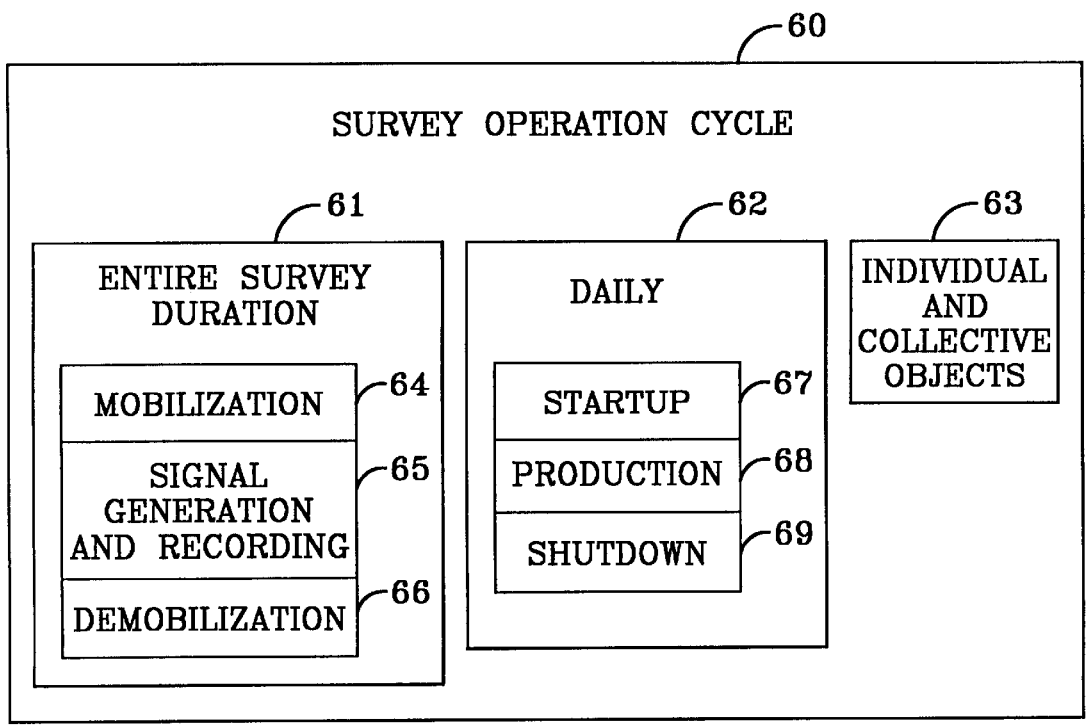
FIG. 6 is a block diagram of the survey operations cycle.

Each survey operations object 50 contains one or more methods to model the activities (or operations) performed by the object in the simulation. In order to design these methods as well as to model interactions between the various objects, operations cycles 60 are shown in FIG. 6 and are identified at three levels: (I) for the entire duration of the survey 61, (ii) daily 62, and (iii) for the objects involved in operations 63 (e.g., transport vehicles, crews), both individually and collectively. The survey duration operations cycle 61 includes three phases: mobilization 64, signal generation and recording 65, and demobilization 66. At the beginning of a survey, all equipment is delivered to a base of operations camp. Mobilization 64 entails moving equipment from the camp location to the field. Signal generation and recording 65 is considered production time where signals are being sent and received. It also involves the movement of equipment to support these operations. Demobilization 66 involves moving all equipment back to the camp when it is no longer required on the field. It is important to note that the phases are usually overlapping. For example, it is generally the case that excess equipment is available for recording. Therefore, signal generation and recording 65 may begin before all equipment has been moved out of the camp, i.e., before the mobilization 64 phase ends. It is advantageous to explicitly consider the survey operations cycle 60 because, in each phase (61–63), an object may be expected to perform different tasks or to behave according to different decision rules. For example, during signal generation and recording 65, a transport vehicle retrieves the minimum of how much equipment is required on a particular part of the survey and its capacity. During the demobilization 66 phase the transport vehicle always retrieves its capacity in order to return equipment to the camp. A daily operation cycle 62 exists because on most surveys, operations cease at night. The daily operation 62 includes morning startup 67, production 68, and evening shutdown 69. Startup 67 includes such things as travel to the survey, turning on and testing the equipment, and diagnosing and repairing problems. Production 68 includes all activities directly associated with signal generation and recording. Shutdown 69 involves such things as deciding when to stop dispatching tasks for the day, preparing equipment for shutdown, logging data, and traveling back to base camp from the survey. Accurate modeling of the daily operations cycle 62 is crucial because startup and shutdown (considered nonproductive operating hours) can account for a significant portion of the total operating hours each day.

Figure 7:
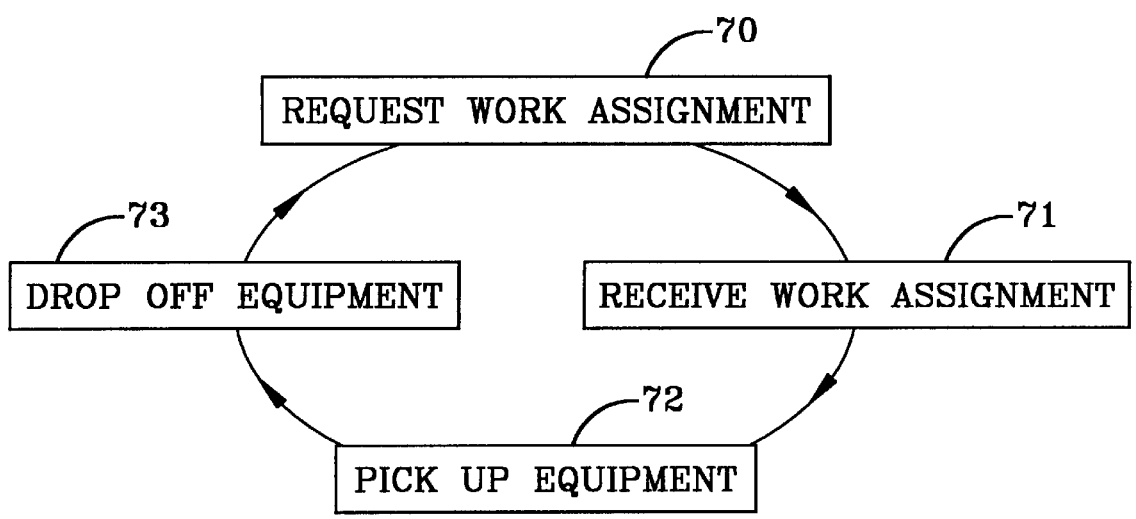
FIG. 7 is a diagram of an operations cycle for a transport vehicle.

At the lowest level, each object on a seismic survey has its own operations cycle. For example, an operations cycle for a transport vehicle is shown in FIG. 7. The cycle starts with the transport vehicle requesting a work assignment 70 (or notifying a manager that it is available for work). When work becomes available, the transport vehicle is given an assignment 71. The assignment entails pickup of equipment 72 on one part of the survey and drop-off at another part 73. When the transport vehicle is free, another work request is made 70 and the cycle repeats. FIG. 7 depicts the most basic form of an operations cycle for the transport vehicle. It could be made more complicated (and realistic) by including scheduled maintenance (e.g., oil check, refueling) and unscheduled breakdowns and repairs using a larger time scale.

Figure 8:
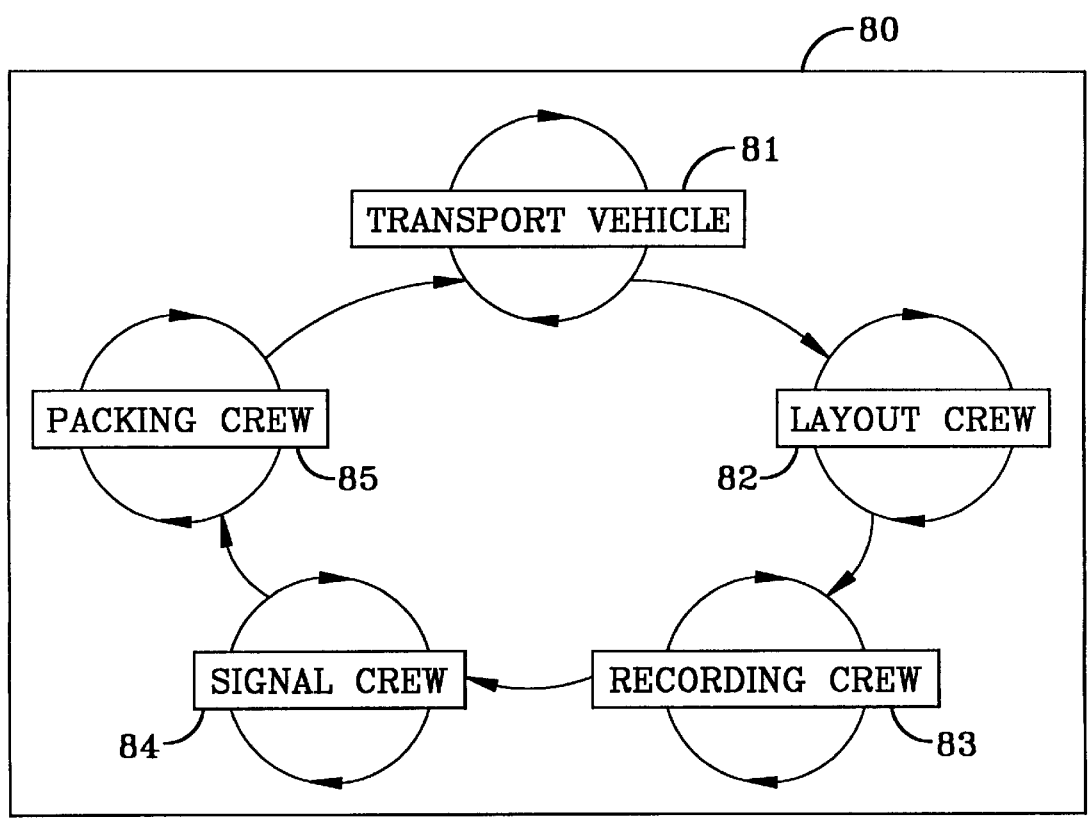
FIG. 8 is a diagram of the operations cycle for shooting and recording operations.

FIG. 8 shows an operation cycle diagram for shooting and recording operations. Objects do not act in isolation on a seismic survey. Rather they act in concert to form a larger operations cycle. For example, the objects that directly support shooting and recording form a larger operation cycle with the following five steps:

(1) transport vehicles 81 pickup equipment prepared by the packing crews and drop-off receiver equipment for installation by the layout crews;

(2) layout crews 82 install receiver equipment for eventual use by the recording crew;

(3) a recording crew 83 controls the sending of signals by the signal crews and records signals at a recording station;

(4) signal crews 84 send signals which are captured by an installed set of receiving equipment. After each signal, equipment no longer required at a receiving location is made available to the packing crews for pickup preparation; and (5) packing crews 85 prepare available equipment for pickup by the transport vehicles.

The diagram of FIG. 8 depicts each object cycling through its own local operations steps and forming a step in the larger operations cycle which represents the progression of the seismic survey. Again, it is important to note that FIG. 8 depicts the most basic operations cycle for the five objects 81–85 that directly support signal generation and recording (55 in FIG. 5) on the survey. It has been made more realistic by adding equipment failures and repairs and other contingency plans when uncertainties arise such as a change in the weather. Additionally, the cycle could also include two additional objects: trouble shooters and mechanics personnel. Although the latter are not directly involved in signal generation and recording, equipment failures can halt production. Therefore, in the simulation model, the operations cycle in FIG. 8 is embellished to include equipment failures and repairs along with trouble shooters and mechanics personnel. Modeling operations cycles at the object level facilitates the design, implementation, refinement, and evolution of the simulation model. For each object, the operations cycle model provides the basis for the method(s) that control(s) the object's behavior during the simulation. The larger operations cycle model formed by the objects working in concert (e.g., FIG. 8) provides the basis for the core of the simulation model.

Figure 9:
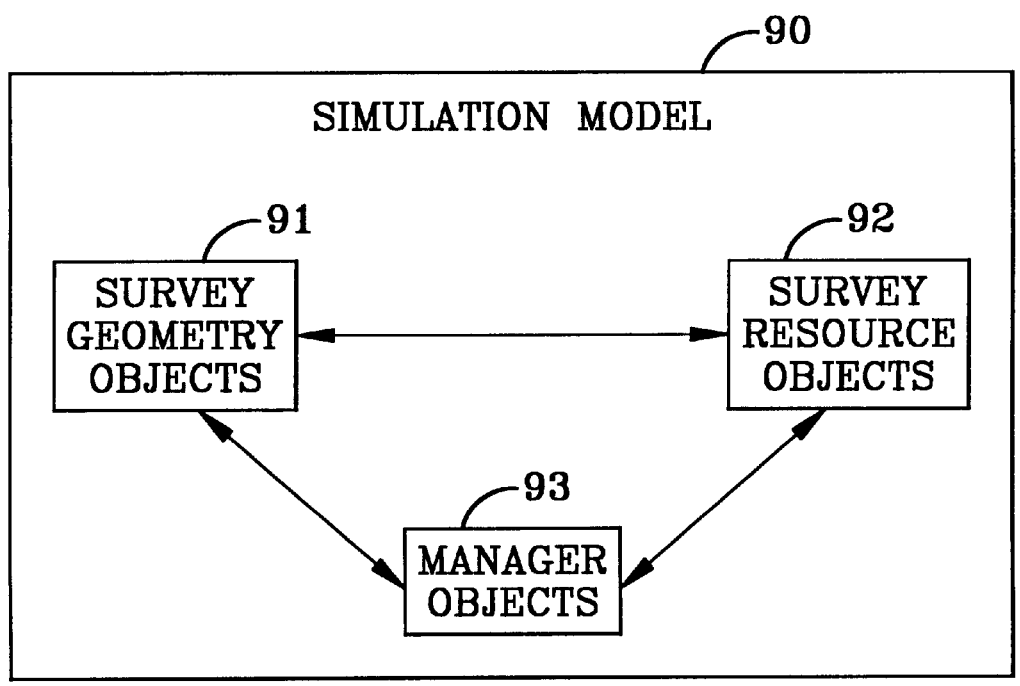
FIG. 9 is a block diagram of the simulation model.

The overall architecture of the simulation model can be viewed as an example of the pipe and filter model (as described in Shaw, M. and D. Garlan. 1996. *Software Architecture: Perspectives on An Emerging Discipline*. Prentice Hall, Saddle River, N. J.) The basics of this design are that each operation or task is viewed as a filter that gets its input from an input stream and writes its output to an output stream. In this specific case, the input stream is usually an ordered queue of receiver hardware and the output stream is an "order on entry" queue of the same type. One key aspect of this architecture is that it makes adding new operations or tasks reasonable, since as long as they know how to read from an ordered queue and write to another ordered queue, integration is quite simple and focused. There may be several ways to view the composition of the simulation model. One way, as shown in FIG. 9 which is a block diagram of the simulation model, is to consider the simulation as being composed of three types of objects: geometry—ones that represent the basic geometric information about the survey 91 (e.g., receiver and sources locations and lines, size of active area); resources—ones that relate to the resources available to do the survey 92 (e.g., number of vehicles, number of crews); and finally the managers 93—ones that use the available resources to act on the specified geometry to get the survey done.

The data in the geometry classes of objects 91 are considered the fixed infrastructure on which the simulation is performed (i.e., these data are not subject to change during the execution of a simulation). Survey designs are not generated by the simulator but by separate off-the-shelf software packages. This software generates a design and writes it (using an industry standard format, SPS) to a data file that is read by the simulator.

The group of classes that embody the link between the survey geometry 91 and the actual project resources 92 can all be thought of as Managers 93. Their basic role is to coordinate their task by looking for an available crew and the resources that crew needs to do their task, and fusing those two together to achieve that task. As an example, the Packing Manager looks at the ordered queue of equipment to be packed, and when it gets to a certain level, looks for an available crew that can do packing, and dispatches that crew to handle that set of equipment. This same idea of looking at two queues, and dispatching tasks is common in the packing manager, vehicle manager, layout manager, and recording manager. It should be noted that the order in which source locations are visited is not a dynamic or managed aspect of the simulator. This overall processing order is based solely on geometric information (i.e., the survey design and optional user partitioning of the survey).

In the implementation of the simulation model, major strategic, tactical and operation policies (or strategies) are separated from the mechanism of the simulation model. This architectural approach allows for sensitivity analysis and possible optimization of these policies, in addition to crew and equipment levels.

Figure 10:
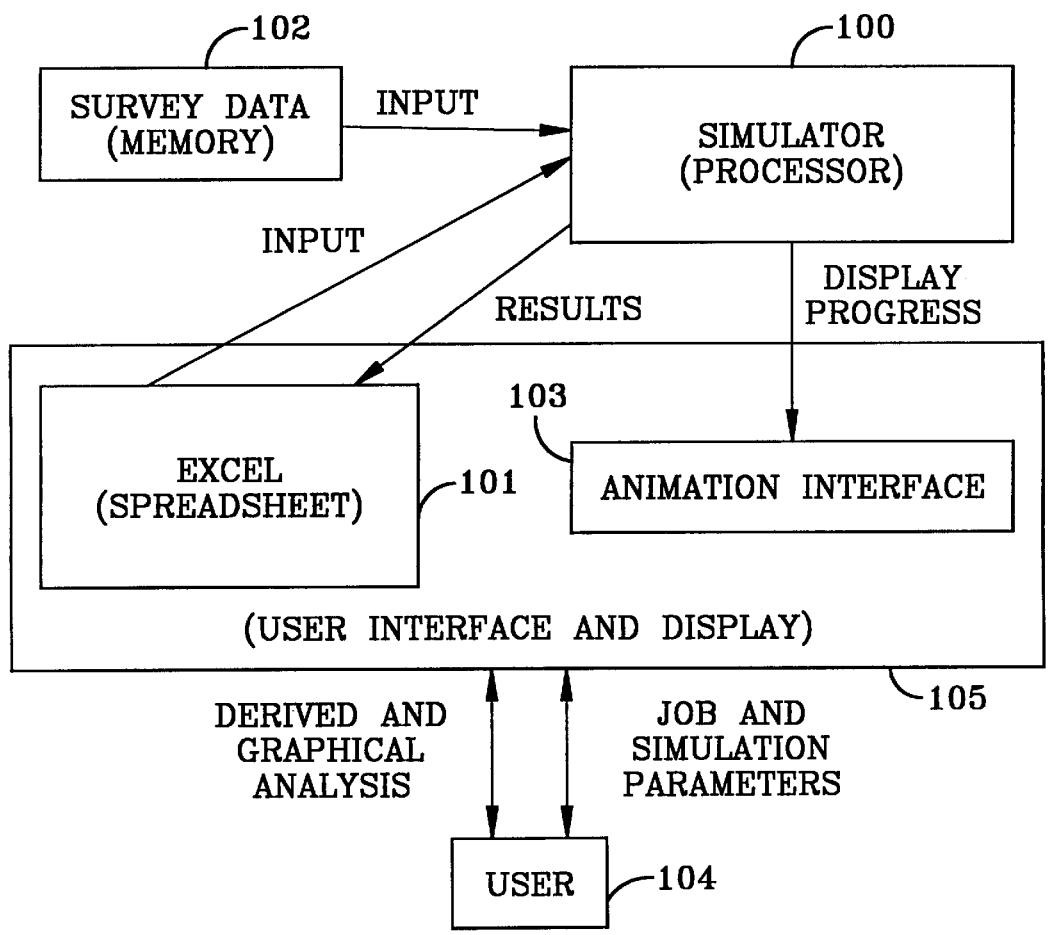
FIG. 10 is a block diagram of the architecture of the simulation model.

FIG. 10 depicts the architecture of the simulator. The simulator 100 may run on a PC platform (processor) in Windows 95/Windows NT since this is usually the platform of choice for field personnel. A spreadsheet product such as Excel 101 constitutes the main user interface and display 105 because field personnel are currently using Excel to support their operations. In fact, much of the data required to drive the simulator already exists in Excel spreadsheets. The user 104 is able to set all simulation parameters and run controls, and invokes the simulator from the Excel display. The simulator 100 running behind Excel was implemented in Visual C++ in the Microsoft Development Environment as a Microsoft Foundations Classes (MFC) Application (Microsoft Corporation 1995). In addition, CSIM17, a library of C++ routines for discrete event simulation, constitutes the simulation engine (Mesquite Software, Inc. 1994). When the simulator is invoked, it reads data from Excel and information on the survey design from the survey data file 102 which may be located in memory. CSIM17 provides the core functionality for a process interaction approach to discrete event simulation. CSIM17 was used because as a library of C++ classes and methods it could be integrated into our overall application and by its component-nature, it is flexible. The main features that were used include support for processes, and events and messages to coordinate and communicate between processes. Additionally, since most of the simulator is written in low level C++ while using a small set of CSIM17 functionality, the resulting system is fast, which is an important feature for simulating large surveys. A simulation environment might have been selected but none were found that supported a problem of this type (open field logistics) and scale.

The animation interface 103 is a MFC Single Document Interface (SDI) application. The simulator 100 produces a list of events as they occur; this event list may be used to drive an animation interface 103 with a 2D display of motion of the survey components over the area of the job. The animation interface 103 provides a user interface and displays 105 the progress of the simulation from a bird's eye view of the survey. It also displays other information from the simulation in the form of messages and statistics. Once the simulation is complete, the user may save the simulation results back to Excel 101. Additionally, the user can load new parameter values from the spreadsheet 101 for subsequent simulation runs. This display is useful in system development, as well as critical in explaining and describing survey execution options.

Once the simulation results are back in Excel 101, the user can use this information to embellish other models already resident in the spreadsheet 101. In addition, the data is available for analysis using the extensive statistical and graphics capabilities available in Excel 101.

Figure 11:
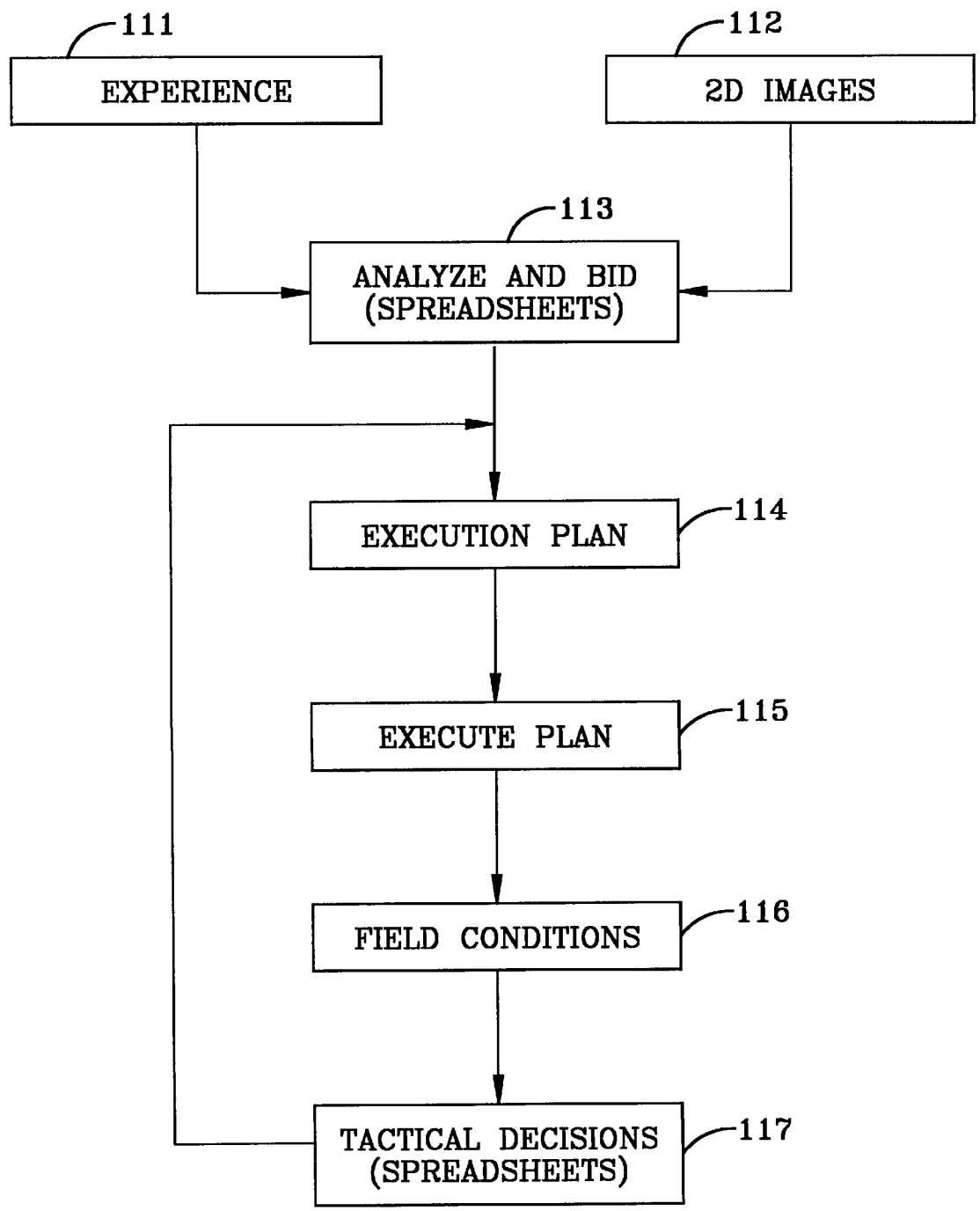
FIG. 11 is a flow diagram of bidding and operating land seismic acquisition jobs prior to the present invention.

The current process of bidding and operating land seismic acquisition jobs is summarized in FIG. 11. Personnel experience 111 and 2D images 112 of the land seismic survey site are used to analyze and bid the survey price 113 using traditional spreadsheets. An execution plan for the survey is generated 114 and the plan is executed 115. Field conditions 116 may require a change in the execution plan during the operational stage of the survey. Tactical decisions 117 based on the changed field conditions are input to a spreadsheet and processing is repeated to generate a new execution plan 114. The process uses simple technologies as described above, without ability to perform simulation-based what-if analysis including the details of the dynamic system, either in the bidding or operational stages.

Figure 12:
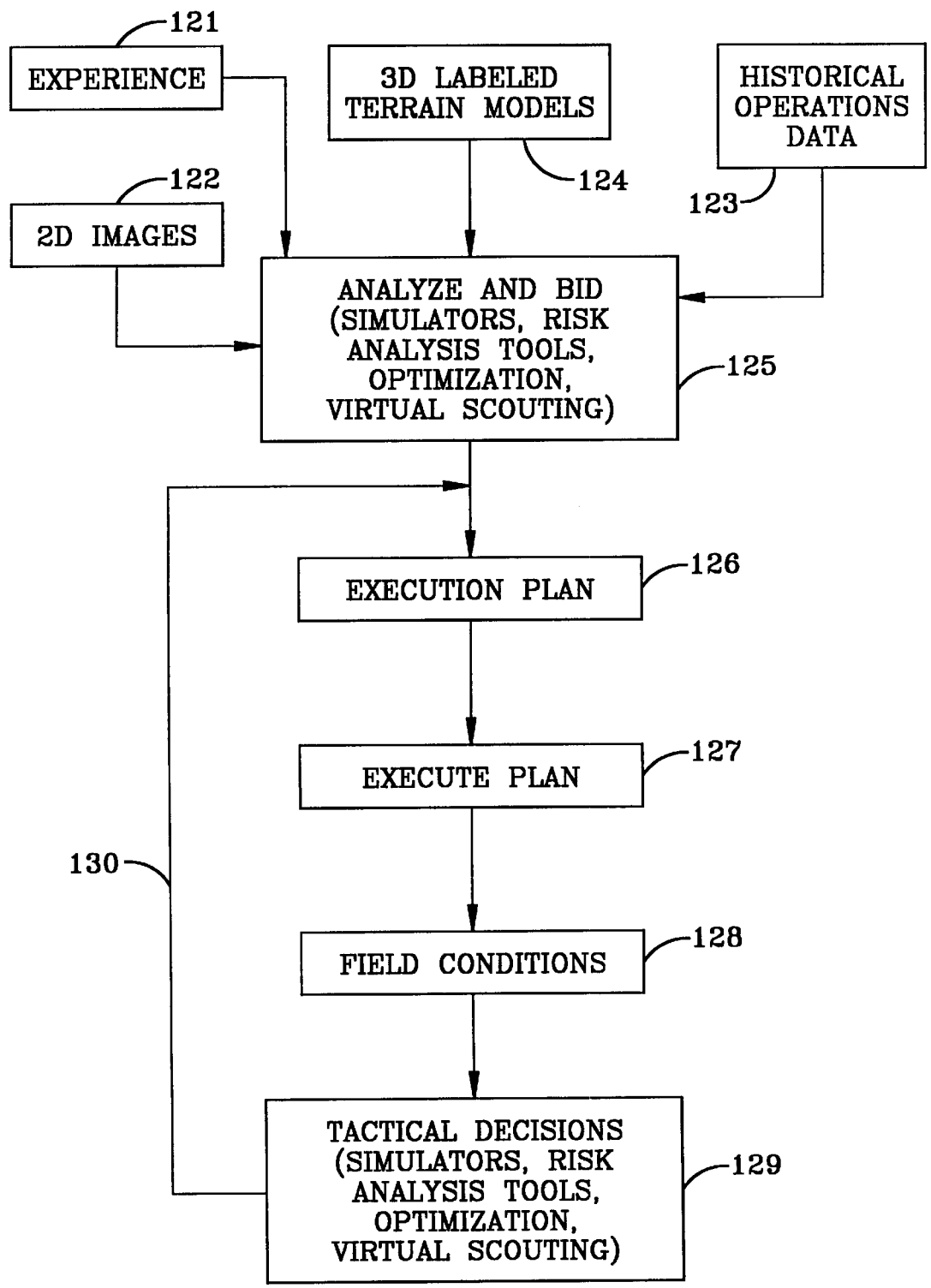
FIG. 12 is a flow diagram of bidding and operating land seismic acquisition jobs according to the present invention.

In FIG. 12, the revised process for land seismic survey bidding and execution is shown. Personnel experience 121, 2D images 122 of the land seismic survey site and historical operations data 123 are used along with 3D labeled terrain models 124 which contain high resolution analyzed imagery and digital elevation models. Information from high resolution analyzed imagery and digital elevation models is used for "virtual scouting" of sites prior to bid, representing a substantial savings in time and travel—accentuated by the global nature of the land seismic business. The technology used to view the data to date has been high end SGI graphical computers used interactively to "fly" above the terrain. This invention utilizes both lower end and more sophisticated virtual scouting aids. Data from imagery sources 122 and 124 is combined with experience data 121 such as cultural information and local knowledge (such as nearsurface geology) to populate a Geographic Information System (GIS), which is in turn employed by the discrete event simulation and optimization components. The analysis and bid is accomplished using simulators (such as the discrete event simulator), risk analysis tools, optimizations and virtual scouting 125. An execution plan for the survey is generated 126 and the plan is executed 127. Field conditions 128 may require a change in the execution plan during the operational stage of the survey. Tactical decisions 129 based on the changed field conditions are input to the simulators, risk analysis tools, optimization and virtual scouting and processing is repeated 130 to generate a new execution plan 126 based on the changed field conditions 128. Discrete event simulation as outlined in earlier sections (and shown in FIG. 4) is used to simulate the dynamic behavior of the components of the land seismic acquisition process. This allows investigation of the impact of changing equipment and personnel allocations on overall profitability and job execution time. The simulation produces a list of events as they occur; this event list is used to drive a 2D display of motion of the survey components over the area of the job. This display is useful in system development as well as critical in explaining and describing survey execution options. The discrete event simulation benefits directly from the analysis of historical operations records to provide timing estimates, breakdown probabilities, and behaviors. This historical operations information 123 is also used to assess job risk based on historical analogs. The various activities and technologies discussed above have equal utility in the field during the job as in the office during the bidding phase. The field use allows better communication of status and more informed decision making. As the events enumerated by any one run of the discrete event simulator are unlikely to be duplicated exactly in a real job (stochastic simulation and stochastic world) the field personnel will benefit as much from the scenario analysis afforded by the simulator as from the details of one run.

Although the present invention has been described in detail with reference to certain preferred embodiments, other embodiments are possible. Therefore, the spirit and scope of the appended claims should not be limited to the description of the preferred embodiments herein.

What is claimed is:

1. A computer implemented method for simulating and optimizing land seismic survey operations, the method comprising the steps of:
   a. obtaining spatially referenced data and nonspatial data relevant to a land seismic survey operation;
   b. inputting discrete event information about the land seismic survey operation;
   c. simulating a land seismic survey utilizing the spatially referenced data, the nonspatial data and the discrete event information; and
   d. optimizing the simulated land seismic survey.

2. The method according to claim 1, wherein the spatially referenced data is high resolution digital imagery.

3. The method according to claim 1, wherein the spatially referenced data is in the form of a high resolution digital terrain map.

4. The method according to claim 3, further comprising storing the high resolution digital terrain map in a geographical information system.

5. The method according to claim 4, wherein the high resolution digital terrain map stored in the geographical information system contains pixels, and each pixel on the map is labeled with information relevant to the land seismic survey.

6. The method according to claim 1, wherein the inputting discrete event information step comprises allowing a user to adjust parameters that control complex dynamic behaviors of discrete events.

7. The method according to claim 6, wherein the complex dynamic behaviors of the discrete events include stochastic processes.

8. The method according to claim 7, wherein the stochastic processes include:
   a. breakdown rates;
   b. weather-related delays; and
   c. travel times.

9. The method according to claim 1, wherein the simulating step permits a user to perform trade-off analyses for different routes, different crews, and different equipment options of the land seismic survey.

10. The method according to claim 1, wherein the output of the simulating step is a detailed listing of events to occur prior to and during the land seismic survey.

11. The method according to claim 10, wherein in the optimizing step, the detailed listing of events is used to optimize and order the events to occur during the land seismic survey.

12. The method according to claim 1, wherein the optimizing step is accomplished using mathematical programming techniques.

13. The method according the claim 1, further comprising inputting historical operations data to improve accuracy of the simulating and optimizing steps.

14. The method according to claim 1, wherein the simulating step is accomplished using a discrete event simulator.

15. The method according to claim 14, wherein the discrete event simulator is an object oriented software program with objects comprising:
   a. survey geometry objects that represent survey design;
   b. resources objects that represent resources needed to conduct survey operations; and c. manager objects to coordinate the resource objects with the survey geometry objects.

16. The method according to claim 15, wherein the resource objects are selected from the group consisting of: transport vehicles, layout crews, recording crews, signal crews, packing crews, trouble shooting crews and mechanics crews.

17. The method according to claim 15, further comprising modeling interactions between the survey geometry objects, resources objects and manager objects using an operations cycle model.

18. The method according to claim 17, wherein the operations cycle model comprises:
   a. duration of survey operations cycle;
   b. a daily operations cycle;
   c. an individual operations cycle for a single resources object; and
   d. a collective operations cycle for multiple resources objects.

19. The method according to claim 18, wherein the duration of survey operations cycle comprises:
   a. mobilization;
   b. signal generation and recording; and
   c. demobilization.

20. The method according to claim 18, wherein the daily operations cycle comprises:
   a. startup;
   b. production; and
   c. shutdown.

21. The method according to claim 20, wherein the startup comprises travel to the survey site, turning on equipment, testing the equipment, diagnosing problems and repairing problems.

22. The method according to claim 20, wherein production comprises signal generation and recording activities.

23. The method according to claim 20, wherein shutdown comprises deciding when to stop tasks for the day, preparing equipment for shutdown, logging data, and travelling back to base camp from a survey site.

24. The method according to claim 15, wherein each object comprises its own operation cycle.

25. The method according to claim 24, wherein the object comprising its own operations cycle is selected from the group consisting of transport vehicles, layout crews, recording crews, signal crews, packing crews, troubleshooting crews and mechanics personnel.

26. The method according to claim 18, wherein the collective operations cycle for multiple resource objects comprises an operations cycle for shooting and recording objects.

27. The method according to claim 26, wherein the operations cycle for shooting and recording objects comprises:
   a. preparing transport vehicle to pickup equipment prepared by packing crews;
   b. preparing to drop-off receiver equipment for installation by layout crews;
   c. installing receiver equipment by layout crews for use by recording crews;
   d. sending signals by signal crews which are captured by an installed set of receiving equipment; and
   e. preparing available equipment by packing crews for pickup by the transport vehicles.

28. The method according to claim 17, wherein the operations cycle model controls behavior of the object.

29. The method according to claim 28, wherein the operations cycle model accounts for uncertainty in the behavior of the object by using probability distributions.

30. The method according to claim 1, wherein steps a through e are performed prior to the land seismic survey.

31. The method according to claim 1, wherein steps a through e are performed during the land seismic survey.

32. The method according to claim 1, further comprising:
   a. performing steps a through e for a first set of discrete events;
   b. saving the results of the optimizing step for the first set of discrete events;
   c. changing one or more of the first set of discrete events so as to form a second set of discrete events;
   d. repeating steps a through e using the second set of discrete events and saving the results of the optimizing step for the second set of discrete events; and
   e. allowing a user to compare the results for the first and second set of discrete events.

33. The method according to claim 4, wherein the high resolution terrain map is used to scout sites prior to bidding a price for the land seismic survey.

34. The method according to claim 33, further comprising allowing a user to view the terrain map interactively on a computer screen.

35. The method according to claim 14, wherein the output of the discrete event simulator provides timing estimates for the survey and breakdown probabilities.

36. The method according to claim 14, wherein the discrete event simulator allows a user to investigate impact of changing a parameter of a discrete event.

37. The method according to claim 14, wherein the discrete event simulator produces an event list of survey events as they occur, the event list being displayed to the user on the terrain map as a two-dimensional display of motion of survey components over an area of the survey site.

38. The method according to claim 14, wherein using historical operations information is used by the discrete event simulator to assess survey risk based on information from the historical operations.

39. The method according to claim 1, wherein optimizing comprises using mathematical programming techniques to optimize simulating a land seismic survey and determining optimal locations for survey bases, field equipment and optimal equipment and crew routing.

40. Computer executable software code stored on a computer readable medium, the code for simulating and optimizing land seismic survey operations comprising:
   a. code to obtain spatially referenced data and nonspatial data relevant to a land seismic survey operation;
   b. code to input discrete event information about the land seismic survey operation;
   c. code to simulate the land seismic survey events utilizing the spatially referenced data, the nonspatial data and the discrete event information; and
   d. code to optimize and order simulated survey events.

41. A computer-readable medium having computer-executable software code stored thereon, the code for simulating and optimizing land seismic survey operations comprising:
   a. code to obtain spatially referenced data and nonspatial data relevant to a land seismic survey operation;
   b. code to input discrete event information about the land seismic survey operation;

c. code to simulate the land seismic survey events utilizing the spatially referenced data, the nonspatial data and the discrete event information; and d. code to optimize and order simulated survey events.

42. The method according to claim 1, wherein the high resolution digital imagery is selected from the group consisting of satellite and airborne sensors.

43. The method according to claim 42, wherein the satellite and airborne sensors contain sensor types selected from the group consisting of optical, laser and radar sensors.

44. The method according to claim 1, wherein the nonspatial data is selected from the group consisting of personnel experience and historical data.

45. The method according to claim 30, further comprising saving the optimizing step results and using the results to develop a price for the land seismic survey.

46. The method according to claim 31, further comprising saving the optimizing step results and using the results to alter tactical decisions while the survey is being performed.

47. A system for simulating and optimizing land seismic survey operations comprising:

a. a memory means for storing spatially referenced data and nonspatial data relevant to a land seismic survey;

b. a processor means for:
   i. simulating a land seismic survey utilizing the spatially referenced data, the nonspatial data and the discrete event information;
   ii. optimizing the simulated land seismic survey; and c. a user interface and display means for:
   i. allowing a user to input discrete event information about the land seismic survey operation;
   ii. displaying progress of the simulation to the user as it is being generated;
   iii. displaying optimized results of the simulation to the user.

* * * * *